3,519,646
MANUFACTURE OF PROPANE-SULTONE
François Contat, Ecully, and Ghislain Schwachhofer, Miribel, France, assignors to Progil, Paris, France, a corporation of France
No Drawing. Filed Jan. 15, 1968, Ser. No. 697,906
Claims priority, application France, Jan. 27, 1967, 48,230
Int. Cl. C07d 89/06
U.S. Cl. 260—327
6 Claims

ABSTRACT OF THE DISCLOSURE

This invention relates to the manufacture of propane-sultone by the dehydration of 3-hydroxy-propane-sulfonic acid in the presence of monochlorobenzene at a temperature of 130–134° C. for a period of approximately ten hours. An azeotrope of dehydration water and monochlorobenzene is distilled off during this period and the resulting solution is distilled to recover propane-sultone.

---

The present invention relates to the manufacture of propane-sultone by dehydration of 3-hydroxy-propane sulfonic acid, in the presence of a specific solvent for the propane-sultone.

It is known to obtain propane-sultone from 3-hydroxy-propane sulfonic acid, according to the reaction:

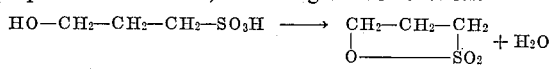

The most usual method consists of dehydrating the acid by heating at 110–150° C., under a high vacuum, generally equal to 5 mm. Hg or lower, while propane-sultone distills off simultaneously. The application of such a vacuum is obligatory for obtaining a good yield. Thus, for example, the collected quantity of propane-sultone, which reaches 80% of the theoretical yield when operating under a pressure of 2 mm., falls to 70% under a pressure of 20 mm. and to 58% under a pressure of 30 mm. This process is generally conducted without using a solvent or diluent.

However, there are processes in which inert compounds which act to favor the dehydration reaction are used. Thus, in a laboratory method concerned with the general preparation of alkane-sultones, the method has been conducted in the presence of xylene. This method consists of dehydrating an hydroxy alkane-sulfonic acid by introducing it in the form of an alcoholic solution into boiling xylene. Dehydration water is removed due to the formation of a ternary azeotrope, water-alcohol-xylene, while an additional quantity of xylene is generally added to the reaction mixture. The alkane-sultone obtained in this way, which remains in solution in the medium is isolated, either by distillation under reduced pressure or by precipitation (Willems-Bull. Soc. Chim. Belge 64 pp. 747–771 (1955)). However, the application of this general method to the manufacture of propane-sultone has never been described.

For the preparation of propane-sultone itself, it has been proposed to use ethylene glycol mono-n-butylether as a diluent. But the yield does not exceed 60% (Willems-Bull. Soc. Chim. Belge 64 pp. 747–771 (1955)). Finally, it has been suggested to conduct dehydration of 3-hydroxypropane sulfonic acid in toluene. Thus, for example, when 40 gr. of hydroxy-propane sulfonic acid was boiled in toluene for 20 hours and then distilled, 5 gr. of propane-sultone were obtained, which corresponds to a yield of hardly 15% with respect to acid (Furukawa J. Chem. Soc. Japan 59, 1028–30 May 9, 1956). Though the applicants have increased this yield to 35% by conducting experiments under optima conditions, the results are still quite insufficient for an operation on an industrial scale.

It has now been found that monochlorobenzene is an inert diluent which is especially favorable for the formation of propane-sultone. The use of this hydrocarbon, in processes for dehydrating hydroxy-propane-sulfonic acid allows obtaining yields which are greater than those which have been noted while using other diluents.

Moreover, the productivity of propane-sultone is greatly increased because the speed of the acid dehydration is greatly improved. Further, the use of monochlorobenzene allows the subsequent isolation of propane-sultone, without requiring the use of a vacuum as high as in the prior techniques.

The results obtained with monochlorobenzene are all the more surprising since it has characteristics which are close to those of already known diluents, especially xylene and toluene. Similarly to xylene and toluene, the monochlorobenzene forms an azeotrope with water and is a solvent for the propane-sultone while it does not dissolve the hydroxy-propane-sulfonic acid. Further, its boiling point (132° C.) is situated in the range of temperatures favoring the formation of propane-sultone, that is between 110–150° C.

However, in trying to explain the reasons for the technical progress made in the manufacture of propane-sultone according to the invention, it is probable that the favorable action by the monochlorobenzene is due especially to 2 facts: it is particularly selective as a solvent for the propane-sultone in the reaction mixture; moreover, the limits of temperature in which the use of monochlorobenzene operates, that is between 120 and 135° C., are probably the optima conditions for the dehydration of hydroxy-propane-sulfonic acid.

Principally, the reaction operates as follows. Under the influence of temperature, the acid used as raw material dehydrates, water is separated from the reaction medium as an azeotrope of water/monochlorobenzene while propane-sultone passes into solution in the hydrocarbon which is present in the dehydration medium.

From a practical point of view, monochlorobenzene may be used in all the known processes of dehydrating hydroxy-propane-sulfonic acid. Thus, it is possible slowly to add 3-hydroxy-propane sulfonic acid into the boiling monochlorobenzene, conveniently stirred, possibly adding a further quantity of diluent during the reaction.

It is also possible to maintain at the boiling point, for a convenient time, the mixture of hydroxy-propane-sulfonic acid and monochlorobenzene.

In those two types of processes it is practical to operate under atmospheric pressure.

However, the application of a pressure lower than normal is not incompatible with the use of monochlorobenzene.

The quantity of monochlorobenzene to use with respect to hydroxy-propane sulfonic acid may vary in large limits. Of course, it is necessary that the solvent be present in a sufficient quantity to carry away the acid dehydration water and to dissolve all the formed propane-sultone. But, taking this condition into account, the proportion of monochlorobenzene to be used is not a critical factor for a good realization of dehydration. However, the use of too large an excess of diluent may constitute a disadvantage during the recovery of propane-sultone because of the large volumes of the solution to be treated.

This recovery can be made by any known means, for example by distilling the solution. But, as it has already been mentioned hereinabove, the use of monochlorobenzene permits this operation to be conducted under a vacuum less high than in the prior technique. Thus, a distillation under a pressure equal to 30 mm. Hg or greater, for example between 30 and 100 mm. does not prejudice the final yield.

It appears clearly that the preparation of propane-sultone, utilizing monochlorobenzene according to the invention, does not need especial equipment and may be conducted in reactors and distillation columns of known type. It is convenient to provide equipment which permits the separation of the azeotrope into its constituents and to recycle the recovered monochlorobenzene, into the dehydration reactor.

The hydroxy-propane-sulfonic acid useful as a raw material for the present invention, may be obtained according to the known processes. For example, the corresponding alkaline salt is first formed, by addition of alkali metal bisulfite to acrolein, followed by a reduction, or by addition of bisulfite to allylic alcohol in the presence of oxygen or of an oxygen-liberating agent, then the free acid is prepared using an inorganic acid, such as hydrochloric acid or an ion-exchange resin.

The examples hereinafter, given in a non-limitative way, show how the present invention may be put into practice.

EXAMPLE 1

This example is intended to show the superiority of monochlorobenzene as a dilution agent as compared to previously used dilution agents, such as xylene and toluene.

Test (a)

262 gr. (1.87 moles) of 3 - hydroxy - propane sulfonic acid and 1200 ml. of monochlorobenzene are charged into a reactor provided with a stirring device and with a phase separator surmounted with a cooler.

A slight boiling is maintained (130–134° C.) for 10 hours. The hetero-azeotrope, monochlorobenzene-water, distills off and is condensed and recovered in the phase-separator. Water is drawn off and monochlorobenzene is recycled continuously into the reactor. At the end of the operation, the reaction mixture is decanted and the monochlorobenzene containing propane-sultone in solution is drawn off; thus separating the heavy insoluble products.

Then the monochlorobenzene and sultone are separated by distilling under a pressure of 30 mm. Hg 196 gr. of propane sultone are obtained, which corresponds to a yield of 85.6% with respect to the hydroxy-propane sulfonic acid used.

Test (b)

The reaction is conducted in the same way as in Test (a) using the same time and with the same respective quantities of reagents except that the monochlorobenzene is replaced by xylene. Because of the boiling point of the xylene, it is necessary to operate at a temperature a little higher than in the previous test, that is at about 142–145° C. 115 gr. of propane-sultone are obtained, which corresponds to a yield of 50.4% with respect to hydroxy-propane sulfonic acid.

Test (c)

The same test as in (a) is conducted except that the monochlorobenzene is replaced by toluene. Because of the boiling point of this latter, the operation is conducted at about 110° C. After 10 hours, 81 gr. of propane-sultone are obtained, which corresponds to a yield of 35.5% with respect to the starting acid.

EXAMPLE 2

2 moles of sodium bisulfite are allowed to react with 2 moles of allylic alcohol according to the known processes. The sodium hydroxy propane sulfonate so obtained is treated with hydrochloric acid and transformed into 3 hydroxy-propane-sulfonic acid.

By operating as indicated in Example 1, after adding 1200 ml. of monochlorobenzene, there is obtained, after 10 hours at 130–134° C., 206 gr. of propane-sultone, which corresponds to a yield of 84.4% with regard to the allylic alcohol used.

Characteristics of the obtained propane-sultone:

Crystallization point.—31° C.
Index of refraction $n_D^{40}$.—1.451
Density.—1.39 which corresponds to the known characteristics of the pure product.

It will be obvious to those skilled in the art that various changes may be made without departing from the scope of the invention and the invention is not to be considered limited to what is described in the specification.

What is claimed is:

1. Process for manufacturing propane-sultone by dehydration of 3-hydroxy-propane-sulfonic acid in the presence of an inert diluent capable of separating the dehydration water in the form of an azeotrope and dissolving the propane-sultone, characterized in that monochlorobenzene is used as the diluent.

2. Process according to claim 1 wherein a mixture of hydroxy-propane-sulfonic acid and monochlorobenzene is maintained under a slight boiling, at atmospheric pressure, for a period of time sufficient to dehydrate practically the whole of the acid, while simultaneously distilling off the azeotrope of water/monochlorobenzene, then isolating the propane-sultone from the resulting solution by distillation under a pressure equal to 30 mm. or greater.

3. Process according to claim 1 wherein the monochlorobenzene is recovered from the azeotrope and recycled into the dehydration reactor.

4. Process according to claim 2 wherein the monochlorobenzene is recovered from the azeotrope and recycled into the dehydration reactor.

5. Process according to claim 2 wherein the mixture of hydroxy-propane-sulfonic acid and monochlorobenzene is maintained at a temperautre of 130–134° C.

6. Process according to claim 2 wherein the mixture of hydroxy-propane-sulfonic acid and monochlorobenzene is maintained at the boiling temperature of the diluent for approximately 10 hours.

References Cited

UNITED STATES PATENTS 3,115,501    12/1963    Finch et al.    260—327

JAMES A. PATTEN, Primary Examiner